(12) United States Patent
Griffiths et al.

(10) Patent No.: US 10,061,785 B2
(45) Date of Patent: Aug. 28, 2018

(54) BULK MANAGEMENT OF REGISTRY OBJECTS

(71) Applicant: VERISIGN, INC., Reston, VA (US)

(72) Inventors: Hui Griffiths, Reston, VA (US);
Srikanth Veeramachaneni, Brambleton, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 15/657,973

(22) Filed: Jul. 24, 2017

(65) Prior Publication Data

US 2017/0322953 A1    Nov. 9, 2017

Related U.S. Application Data

(63) Continuation of application No. 13/871,440, filed on Apr. 26, 2013, now Pat. No. 9,715,512.
(Continued)

(51) Int. Cl.
*G06F 17/30* (2006.01)
*H04L 29/12* (2006.01)

(52) U.S. Cl.
CPC ...... *G06F 17/30289* (2013.01); *H04L 61/302* (2013.01)

(58) Field of Classification Search
CPC ........... G06F 17/30864; G06F 11/1451; G06F 11/1469; G06F 2201/80; G06F 17/30321; G06F 17/30477; G06F 17/30554; G06F 17/30557; G06F 8/61; G06F 9/44505; G06F 17/30289; G06F 17/5009; G06F 19/322; G06F 2009/45579; G06F 21/31; G06F 2217/06; G06F 2221/2119; G06F 3/038; G06F 3/1454; G06F 7/026; G06F 9/06; G06F 9/45558

USPC ....... 709/223, 201, 203, 217, 245, 219, 220, 709/229, 221, 224, 218, 222, 225, 228, 709/232, 238, 241, 242, 248, 250, 206, 709/207; 717/169, 171, 172, 173, 175,
(Continued)

(56) References Cited

U.S. PATENT DOCUMENTS 6,496,855 B1   12/2002  Hunt et al.
6,557,169 B1    4/2003  Erpeldinger
(Continued)

OTHER PUBLICATIONS

Lario Nocentini (Examiner), Extended European Search Report dated Jul. 16, 2013, European Application No. EP13165656, filed Apr. 26, 2013, pp. 1-7.
(Continued)

*Primary Examiner* — Ashish Thomas
*Assistant Examiner* — Ken Hoang
(74) *Attorney, Agent, or Firm* — MH2 Technology Law Group, LLP

(57) ABSTRACT

A system and method for modifying a bulk set of domain names through bulk operations. A request to modify a bulk set of data associated with domain names is received by a registry. A bulk processing engine associated with the registry can analyze the requested update job, and enforce compliance with a set of policies governing the operation of registry. A priority level can also be assigned to the requested job, so that it will be executed before or after other pending jobs. The user can likewise provide user-supplied policies, which can also be validated against the set of registry policies. Data faults can be reduced or eliminated, and update operations can be performed by comparatively inexperienced personnel.

20 Claims, 5 Drawing Sheets

Related U.S. Application Data

(60) Provisional application No. 61/639,751, filed on Apr. 27, 2012.

(58) Field of Classification Search
 USPC ....... 717/178, 106, 121, 168, 170, 174, 176,
  717/177; 713/2, 155, 156, 157, 158, 170,
  713/175, 176, 177, 180; 705/1.1, 400,
  705/14.23, 14.4, 14.49, 26.1, 28, 3, 30,
  705/305, 31, 32, 34, 35, 36 R, 37, 39, 59,
  705/7.11, 7.31, 7.35; 707/E17.108, 722,
  707/E17.002, E17.005, E17.009, E17.014,
  707/E17.085, 609, 673, 684, 822,
  707/999.002, 999.01
 See application file for complete search history.

(56) References Cited

U.S. PATENT DOCUMENTS

| | | |
|---|---|---|
| 6,880,007 B1 | 4/2005 | Gardos et al. |
| 6,895,430 B1 | 5/2005 | Schneider |
| 6,901,436 B1 | 5/2005 | Schneider |
| 6,973,505 B1 | 12/2005 | Schneider |
| 7,188,138 B1 | 3/2007 | Schneider |
| 7,194,552 B1 | 3/2007 | Schneider |
| 7,299,299 B2 | 11/2007 | Hollenbeck et al. |
| 7,539,774 B2 | 5/2009 | Stahura |
| 7,565,402 B2 | 7/2009 | Schneider |
| 7,600,042 B2 | 10/2009 | Lemson et al. |
| 7,634,808 B1 | 12/2009 | Szor et al. |
| 7,904,898 B2 | 3/2011 | King et al. |
| 8,015,244 B2 | 9/2011 | King et al. |
| 8,037,168 B2 | 10/2011 | Schneider |
| 8,224,994 B1 | 7/2012 | Schneider |
| RE43,690 E | 9/2012 | Schneider et al. |
| 8,312,125 B1 | 11/2012 | Rioux et al. |
| 8,369,357 B2 | 2/2013 | Iyer et al. |
| RE44,207 E | 5/2013 | Schneider |
| 8,458,161 B2 | 6/2013 | Schneider |
| 8,612,565 B2 | 12/2013 | Schneider |
| 8,635,340 B1 | 1/2014 | Schneider |
| 2002/0052771 A1 | 5/2002 | Bacon et al. |
| 2005/0182781 A1 | 5/2005 | Bouvet |
| 2006/0080437 A1 | 4/2006 | Lake |
| 2008/0016233 A1 | 1/2008 | Schneider |
| 2008/0059607 A1 | 3/2008 | Schneider |
| 2008/0071823 A1 | 3/2008 | Fellman |
| 2010/0036946 A1 | 2/2010 | Von Arx |
| 2011/0060950 A1 | 3/2011 | Waldron et al. |
| 2012/0226606 A1 | 9/2012 | Brown |
| 2012/0296948 A1 | 11/2012 | Bailey et al. |
| 2012/0303733 A1 | 11/2012 | Thomas |
| 2012/0303808 A1 | 11/2012 | Xie |
| 2012/0304004 A1 | 11/2012 | Gould et al. |

OTHER PUBLICATIONS

Hollenbeck et al., "Extensible Provisioning Protocol (EPP) Domain Name Mapping; rfc5731.txt", Internet Engineering Task Force, IETF; Standard, Internet Society (ISOC) 4, Rue Des Falaises CH-1205 Geneva, Switzerland, Aug. 1, 2009, pp. 1-67.

McMillan et al., "Shared Registry System—Technical Architecture", Jan. 1, 2002, http://dnc.org.nz/content/srs_tech_architecture-v.1.2.pdf, accessed Dec. 4, 2012, pp. 1-56.

Hollenbeck et al., "Extensible Provisioning Protocol (EPP); rfc5730.txt", Internet Engineering Task Force, IETF; Standard, Internet Society (ISOC) 4, Rue Des Falaises CH-1205 Geneva, Switzerland, Aug. 1, 2009, pp. 1-57.

Gianpaolo Cugola et al., Processing Flows of Information: From Data Stream to Complex Event Processing, ACM Computing Surveys, vol. 44, No. 3, Article 15, Jun. 2012, pp. 1-62.

Table of Stored Use Cases 401

| BulkUpdate 302 | HighPriority 305 |
|---|---|
| BulkTransfer 303 | LowPriority 306 |
| | |
| | |

*Fig. 4*

Example Use Cases 301

| BulkUpdate 302 |
|---|
| BulkTransfer 303 |
| |
| |

Example Priority Levels 304

| HighPriority 305 |
|---|
| LowPriority 306 |
| |
| |

*Fig. 3*

BULK MANAGEMENT OF REGISTRY OBJECTS

RELATED APPLICATIONS

This application is related, and claims priority, to U.S. application Ser. No. 13/871,440, filed Apr. 26, 2013, entitled "Bulk Management of Registry Objects", which claims priority to U.S. Provisional Application No. 61/639,751, filed Apr. 27, 2012, entitled "Bulk Management of Registry Objects," both by the same inventors herein, assigned or under obligation of assignment to the same entity, and which both applications are incorporated by reference in their entirety.

FIELD

The present disclosure relates to the field of managing domain names, and more particularly, to systems and methods for modifying domain names through bulk operations.

BACKGROUND

The Domain Name System (DNS) allows people using the Internet to refer to domain names, rather than Internet Protocol (IP) addresses, when accessing websites and other online services. Domain names, which employ text characters, such as letters, numbers, and hyphens (e.g., "www.example.com"), will often be easier to remember than IP addresses, which are numerical and do not contain letters or hyphens (e.g., "128.1.0.0").

Domains exist at various different levels within the DNS hierarchy. For example, a generic top-level domain (gTLD), such as .COM or .NET, is a domain at the highest level in the DNS hierarchy. Another type of TLD is a country-code top-level domain (ccTLD) such as, for example, .UK. A second-level domain (SLD) is a subdomain of a TLD (including gTLD and ccTLD), which is directly below the TLD in the DNS hierarchy. For example, .COM is the TLD and EXAMPLE is the SLD for the domain name "www.example.com."

Registries manage the domain names of each TLD. For example, Verisign is a well-known registry, and it manages the .COM and .NET TLDs. To maintain a domain name in accordance with current regulations mandated by Internet Corporation for Assigned Names and Numbers (ICANN), the registry responsible for a TLD is required to maintain a certain minimum amount of information associated with the domain name to ensure proper identification, security features, ownership, operability, and other attributes associated with the domain name. For example, all domain registrants are required to make available to the registry or the registrar their current administrative contact information. Also, in order for a domain name to work correctly, the registry must have nameserver information for the domain name to load into the registry's TLD DNS system to refer outside DNS requests to the proper authoritative DNS servers. Other information encoded in the registry can include the registrar through which the domain name's registration took place, the registration date, the expiration date, and the status of the domain name.

Registries often need to modify a set of data encoded in their data stores on a large-scale bulk or batch basis. For example, registries may need to transfer a large number of registered domain names from one owner to another, for instance when corporate entities merge or otherwise change. Registries may need to update the records in their data stores to transfer domains from one registrar to another registrar. Registries may need to perform these and other update operations at once or concurrently. These operations can include updating the domain names' statuses, expiration dates, or associated nameservers. Registries may modify a bulk set of domain names for their own maintenance purposes, and/or may be required to do so by ICANN, a court order, or other third-party entity. In cases, the domain names themselves may be updated, and in cases, attributes associated with the domain names can in addition or instead be updated.

Modifying a bulk set of domain names typically involves a high level of coordination among multiple registry administrators, and typically requires manual checks to ensure that proper action is taken in handling the data update. In carrying out these update operations, the chance of introducing data faults or programmatic errors is high. In general, in maintenance operations as known, a registry administrative user must manually modify each domain name in a bulk request, with or without the assistance of a bulk tool, which could require the handling of thousands of domain names. Successfully completing the various modifications, without making mistakes or causing other unintended impacts to related data, demands someone with expertise in the data structures and content of the registry's system (e.g., a "super user"). Even with a highly experienced user, a great deal of time and care is required to perform large-scale update operations on a registry. And when those operations are carried out, it is not uncommon to discover that at least some of the updates to the registry could or have caused violations of underlying registry policy, data dependency problems, and/or other programmatic faults.

There accordingly exists a need to enable bulk modifications and associated large-scale operations on DNS registries, while at the same time carrying out policy enforcement and other integrity checks to ensure a complete and correct modification process which reduces or eliminates programmatic update errors. Furthermore, registries may wish to schedule large-scale update operations during times which minimize the impact on regular DNS operations. Registries may likewise desire to track update operations and generate reports on update results, for purposes of later audits, version rollbacks, or other purposes.

BRIEF DESCRIPTION OF THE DRAWINGS

FIG. 3 illustrates an exemplary list of use cases and priority levels for implementing the disclosed embodiments.

FIG. 4 illustrates an exemplary table of use cases for implementing the disclosed embodiments.

DETAILED DESCRIPTION

Reference will now be made in detail to the present embodiments of the disclosure, certain examples of which are illustrated in the accompanying drawings.

Figure 1:
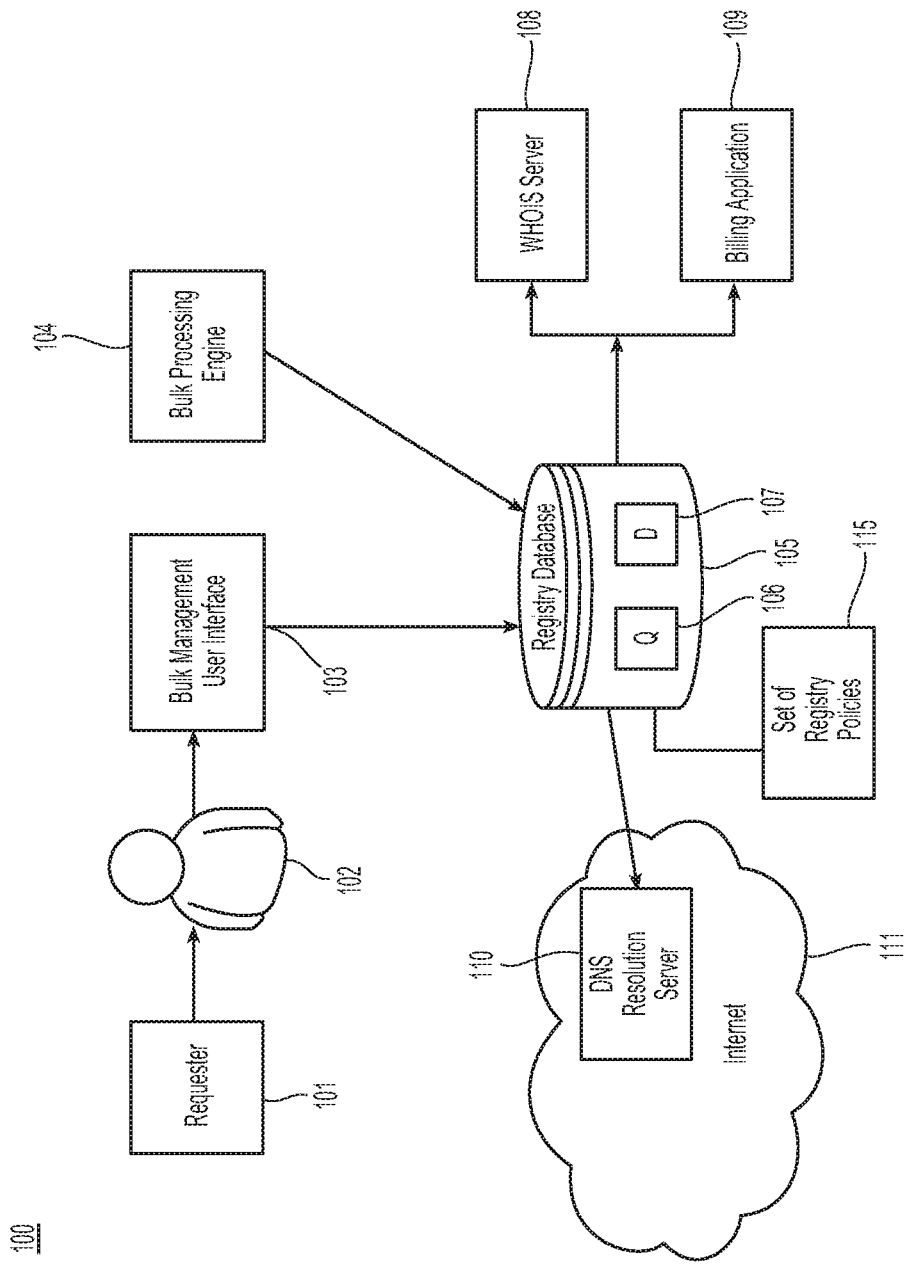
FIG. 1 illustrates an exemplary system for modifying domain names through bulk operations using the disclosed embodiments.

FIG. 1 illustrates a system 100 for managing a large number of domain names through bulk operations. In system 100, a user 102 may receive a request to modify information associated with a number of domain names (which can be referred to as a "bulk request") from a requester 101. User 102 can be a user of a registry that manages the TLD of the subject domain names. Requester 101 could include a third-party entity such as ICANN, a court submitting a court order requesting modification, a corporation, or another third-party. In embodiments, third-party requester 101 may include the registry itself that manages the TLD of the domain names. Thus, registries may on their own decide to modify information associated with a large number of domain names, at once.

In conventional DNS platforms, a user would receive the request and manually modify each domain name in a registry database. Because this requires a high level of expertise, registries typically employed highly skilled users to perform the necessary modifications. The system 100, however, provides a means for enabling any user 102, including a novice user, to process the requests directly.

Once user 102 receives the request, he or she may create a job for processing the request on a batch basis, using a bulk management user interface 103. Bulk management user interface 103 may be configured to allow user 102 to define custom parameters for the pending job. Bulk management user interface 103 may also be configured to display to user 102 information related to the status of the job, such as whether the job is still pending, is executing, or has been completed. Bulk management user interface 103 may in implementations be or include a software application running on a server. In other embodiments, it may be or include a Web interface with access available only to qualified registry users.

User 102 may submit the requested job to a queue 106 in a registry database 105. Registry database 105 may contain one or more additional databases, such as a domain name database 107, which stores administrative information and other data relating to each domain name in a particular TLD. Registry database 105 may have an associated bulk processing engine 104, which can be or include hardware, software, communications resources configured to assist in the management of update operations of the registry database 105. In aspects, the bulk processing engine 104 can organize, maintain, and store data, software, and/or other resources to carry out update operations on the registry database 105 and associated data on an automated, scheduled, and/or otherwise programmatic basis. Registry database 105 may store information that the bulk processing engine 104 may use to process the jobs in queue 106. Registry database 105 may likewise have an associated set of registry policies 115 which govern the operation of the registry database 105, including to ensure data consistency, verify fault-fee data dependencies, maintain data privacy and/or security, and other desired features.

Figure 2:
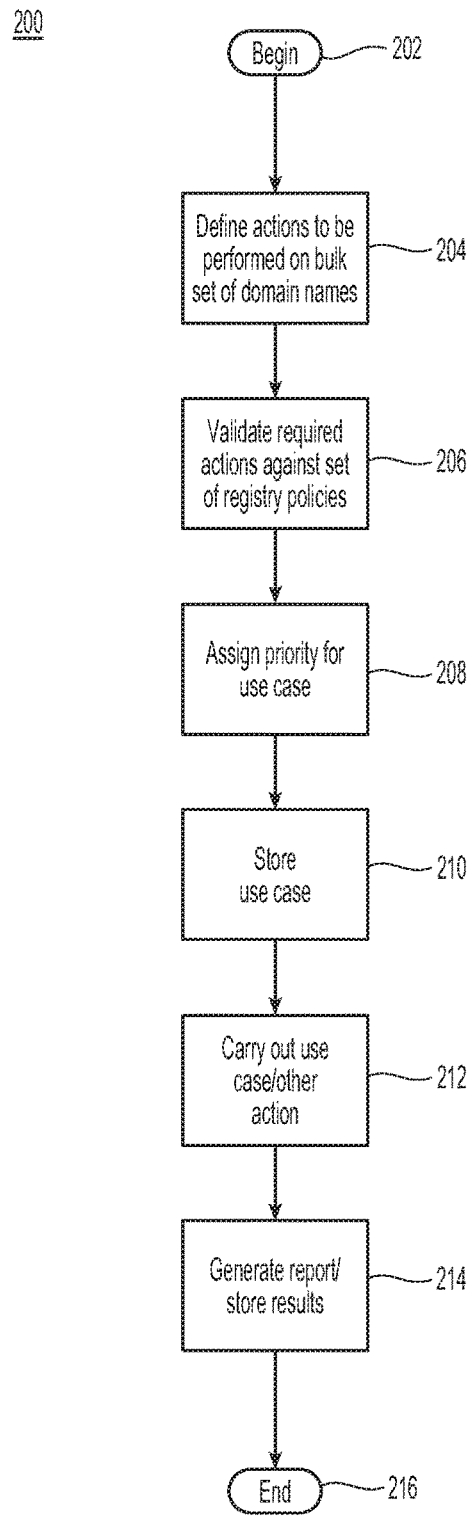
FIG. 2 illustrates an exemplary method for determining priority levels to employ for use cases for executing bulk operations using the disclosed embodiments.

For example, FIG. 2 illustrates a method 200 used by a registry for storing information that bulk processing engine 104 may use to process the jobs in queue 106. In one embodiment, processing can begin in 202. In 204, a registry may define a particular action to be performed on information associated with a bulk set of domain names. Registries may, in cases, designate these actions as "use cases" or "bulk operations." Each use case or bulk operation can have a unique set of parameters and built-in validation to enable user 102 to execute them safely. FIG. 3 illustrates exemplary use cases 301 of bulk operations to be performed on information associated a bulk set of domain names. For example, in one embodiment a registry may determine the need to modify the expiration date of a large set of domain names. A registry may designate this use case as a "BulkUpdate 302." In other embodiments, a registry may determine the need to transfer ownership of a bulk set of domain names from a first owner to a second owner, which task can be designated as a "BulkTransfer 303." Other use cases or operations are possible.

Turning back to FIG. 2, in 206, the bulk processing engine 104 can validate or normalize the requested job or actions against the set of registry policies 115. For instance, the bulk processing engine 104 can identify requested actions which would results in a change or update to a domain name and/or other record which has the status of "pending delete" or "pending transfer." The bulk processing engine 104 can suspend or deny those operations, since those records are scheduled to be removed from or moved within the registry database 105. The bulk processing engine 104 can test the requested job or actions against other types of status or attributes associated with the records of the registry database 105, as well. Bulk processing engine 104 can likewise enforce other kinds of policies during bulk processing operations, such as for instance security policies involving privilege rights of users.

In 208, a registry may assign a priority for a particular use case. The priority of a use case may determine when bulk processing engine 104 processes the job related to a bulk set of domain names.

FIG. 3 also illustrates exemplary priority levels 304 for any given use case (low/high), but it will be appreciated that other types of priorities may be used. In terms of order or schedule of execution, in embodiments as shown, a priority level of HighPriority 305 indicates that the use case will always get processed at the immediate next available time. In some embodiments, a first job designated as HighPriority 305 will be processed after all other jobs designated as HighPriority 305—that were created and entered into queue 106 before the first job—get processed. A priority level of LowPriority 306 indicates that the use case will get processed, but not during a certain time interval and/or before high-priority tasks. In some embodiments, this time interval can reflect the time when the registry's servers are typically busiest (e.g., a "peak period"). A registry may not want bulk processing engine 104 to make modifications to the registry's system during those peak periods, because it would overload the system, risking malfunction. In cases, this time interval can be from 2:00 PM to 4:00 PM during weekdays or at other times, but will be appreciated that other intervals can be used to identify peak periods or other periods of interest.

Referring again to FIG. 2, in 210, a registry may store the use case and (and any assigned priority for that use case) in a local database. FIG. 4 illustrates an exemplary table of stored use cases 401. In table 401, a registry may store BulkUpdate 302 as one of the bulk operations to be performed on a bulk set of domain names and may assign it HighPriority 305. Table 401 also illustrates that a registry may store BulkTransfer 303 as a bulk operation, assigning it LowPriority 306.

In embodiments shown in FIG. 2, in 210 a registry may store one or more use cases and associated priority levels in registry database 105 or other storage, accessible by bulk processing engine 104. A registry may also from time to time modify its use cases and/or their priority levels. For example, a registry may add a new use case and assign it a priority level, or a registry may delete use cases. Additionally, a registry may change the stored or preassigned priority level of a particular use case. For example, in one embodiment, a registry may change the priority level of BulkUpdate 302 in table 401 (FIG. 4) from HighPriority 305 to LowPriority 306. In other embodiments, bulk processing engine 104 may store the use case and its priority in a local database or other data store. A registry may then send updates to bulk processing engine 104 reflecting changes to the use cases or their priority levels. Bulk processing engine 104 uses the use cases and their stored priorities in determining how and when to process each job created by user 102. In 212, the registry 105 can carry out the selected or scheduled use case and/or other action. In 214, the registry 105 can generate a report and/or store results, for audit or other purposes. In 216, processing can return to a prior processing point, jump to a further processing point, or end.

Figure 5:
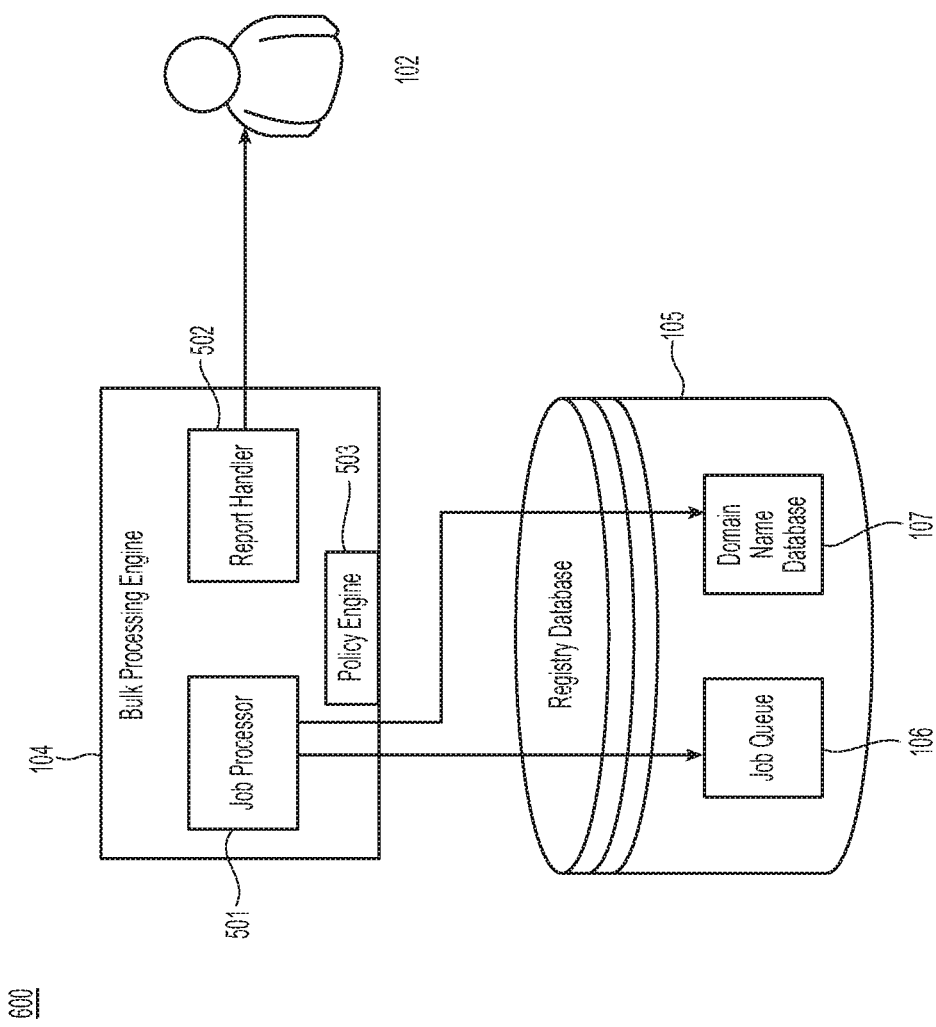
FIG. 5 illustrates an exemplary subsystem for modifying domain names through bulk operations, in which a bulk processing engine polls a job queue, modifies domain names in a domain name database, and generates a report using the disclosed embodiments.

Referring again to FIG. 1, once user 102 submits a job to queue 106, bulk processing engine 104 will process the job according to the priority level indicated by the job's use case. FIG. 5 illustrates aspects of a subsystem 500 for bulk processing engine 104 to perform bulk operations on information associated with a set of domain names. In embodiments, bulk processing engine 104 may poll queue 106 in registry database 105 to determine whether any new jobs have been added to queue 106. If bulk processing engine 104 determines that a new job exists, it may determine whether the job is ready to be executed, according to its priority level. For example, at 2:30 PM bulk processing engine 104 may determine that a new job has been created in queue 106, whose use case is BulkTransfer 303 (FIG. 4). In embodiments, bulk processing engine 104 may then determine that BulkTransfer 303 has been assigned LowPriority 306, meaning that this job cannot be executed from 2:00 PM to 4:00 PM or other peak period. In this case, bulk processing engine 104 will not immediately process this job and will wait until the job can be executed, according to its priority level. Bulk processing engine 104 can continue to poll queue 106 for jobs that are ready to be executed.

In FIG. 5, if a job is ready to be executed, a job processor 501 in bulk processing engine 104 may process the job. For example, in one embodiment, if the job indicates BulkUpdate 302 is to be performed on 1,000 domain names, job processor 501 will update the expiration date of each of the 1,000 domain names in domain name database 107. Thus, job processor 501 can operate asynchronously of user 102 and other registry system operations. In this manner, user 102 can schedule in advance multiple jobs to be processed by job processor 501 in bulk processing engine 104.

In executing the job for a bulk set of domain names, bulk processing engine 104 can be configured to keep reports for purposes of an audit trail of the modifications performed on the information in domain name database 107. For example, if a court ordered the bulk operation on the information associated with a bulk set of domain names, a registry may want to provide a report after completing the operation to verify that it satisfied the court order. In one embodiment, a report handler 502 in bulk processing engine 104 may track the modifications performed to registry data, and generate a report detailing the operations performed by job process 501. Report handler 502 may send the report to user 102, for instance via an e-mail message and/or other messaging format. The report may deliver the results of the job, and can if desired be customized based on the use case.

In further embodiments, report handler 502 in addition or instead may deliver the report to bulk management user interface 103 (FIG. 1), which can be accessed and viewed by user 102. Report handler 502 may provide the current status of the job in bulk management user interface 103. For example, report handler 502 may indicate that the job is waiting for execution, currently being executed, or completed.

Returning to FIG. 1, once bulk processing engine 104 has executed a job in queue 106, registry database 105, potentially including domain name database 107 and/or other data stores, will reflect the changes to the information associated with domain names that were requested in the user's job request. Those changes in registry database 105 and/or other data stores may be pushed to one or more resolution services. The resolution services may include a DNS resolution server 110 for the Internet 111, a WHOIS server 108, a billing application 109, and/or other server, application, or service. DNS resolution server 110 may store a mapping of the modified domain names to IP addresses. WHOIS server 108 may store administrative and contact data regarding the customers (e.g., registrants) that have created the domain names. Billing application 109 may store and process financial information regarding the domain names. For example, in performing the bulk operation on information associated with a bulk set of domain names, the registrant who should be billed for the registration of the domain name may change as a result of the bulk operation. The new registrant's information may be propagated to billing application 109 and/or other application or services, so that it can bill the correct entity for the domain name registration.

Figure 6:
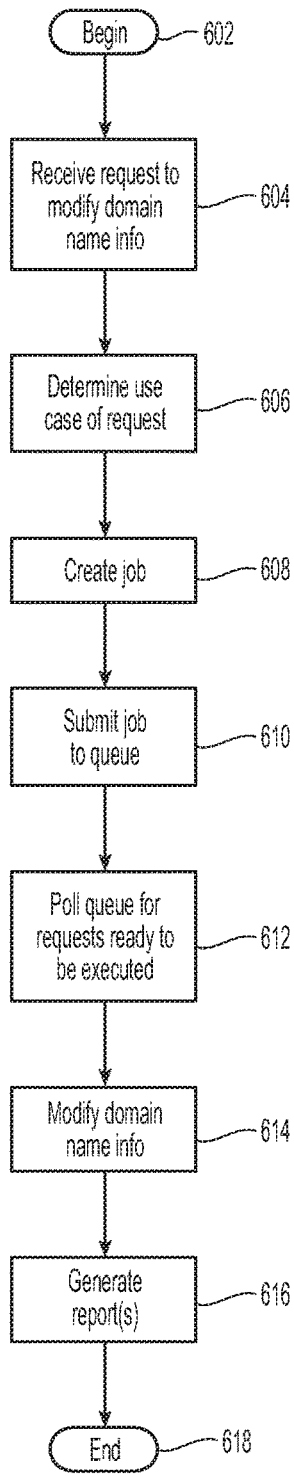
FIG. 6 illustrates an exemplary method for modifying domain names in response to a request using the disclosed embodiments.

FIG. 6 illustrates a method 600 for performing bulk operations on information associated with a bulk set of domain names. In 602, processing can begin. In 602, user 102 (FIG. 1) may receive a request to modify information associated with a bulk set of domain names. User 102 may receive the request from third-party requester 101, from the registry itself, and/or from other sources. In step 604, user 102 may determine a use case of the request. For example, user 102 may determine that the request seeks for a registry to update the expiration dates of a set of domain names, in one operation. In that case, user 102 may determine that the use case of the request is BulkUpdate 302 (FIG. 3) and the priority of BulkUpdate 302 is HighPriority 305 (FIGS. 3-4).

In step 608, user 102 may create a job for the request, for instance using bulk management user interface 103. In embodiments, user 102 may generate or specify customized policies or parameters for one or more of the domain names or other records in the subject set of domain names. For example, in embodiments, user 102 may want to skip domain names that have a particular status, such as "pending transfer" or "pending delete." If a particular domain name is pending transfer to another owner, user 102 may not want bulk processing engine 104 to modify the expiration date of that domain name so that it can be transferred to the new owner, as is. Other situations may exist where user 102 may want customized policies for a particular domain name or based on other factors. The customized policies specified by the user can be received, stored, modified, and/or applied by the policy engine 503 (FIG. 5), and/or by other logic or services.

Thus, user 102 may prevent the bulk operation from being executed on a particular domain name or sets of domain names, by generating customized policies, when desired. The policy engine 503 can, in general, validate or rectify any user-supplied policies against the set of registry policies 115, to ensure that the parameters supplied by the user do not cause a conflict or fault in the data or the execution of the user's job. In this manner, even though the job created by user 102 will include every domain name in the bulk set, bulk processing engine 104 will only modify those domain names according to both the use case, the set of registry policies 115, and the user-supplied customized policies.

In 610, user 102 may submit the job to queue 106 (FIG. 1) to be processed. The job may now contain the use case or other specification of the request, the priority of the job, and any customized policies for information related to domain names. For example, the job may indicate that the use case is BulkUpdate 302, and the priority is HighPriority 305 (FIGS. 3-4). Further, the job may contain user-supplied customized policies for domains that have a "pending transfer" or "pending delete" status, such that the BulkUpdate 302 operation does not get executed on those domain names. The job may also indicate the bulk set of domain names on which BulkUpdate 302 should be executed.

In 612, bulk processing engine 104 (FIGS. 1 and 5) can poll queue 106 to determine if the job is ready to be executed. In embodiments, bulk processing engine 104 can determine whether other jobs in queue 106 were created before the instant job, and if so, whether those other jobs have the same or different comparative priority as the instant job. Thus, in some embodiments, bulk processing engine 104 may first execute other jobs that have the same priority level but earlier queue entry time as the instant job. In other embodiments, bulk processing engine 104 may determine that the instant job's priority indicates that it should not yet be executed. For example, if the instant job had a priority of LowPriority 306, and bulk processing engine 104 polled queue 106 at 2:30 PM, it may determine that the instant job should not yet be executed. In that case, bulk processing engine 104 can continue to query queue 106 to determine if other jobs are ready to be executed.

Once bulk processing engine 104 determines that the instant job is ready to be executed, it may modify information related to the bulk set of domain names (indicated in the job) according to the use case or other update specifications or details, and the customized policies indicated in the job, if any. In embodiments, bulk processing engine 104 may store information relating to the job in a local database or other data store. Bulk processing engine 104 may execute the bulk operation of the job on each domain name in the bulk set of domain names. As a result, bulk processing engine 104 can modify information in the registry database 105, and any of its constituent parts such as domain name database 107, and/or other associated records.

In embodiments, user 102 may at times want to reverse the bulk operations performed on a bulk set of domain names. By referencing the report generated by report handler 502 (FIG. 5), user 102 may create a new job in step 603 (FIG. 6) to be executed by bulk processing engine 104 (FIG. 5). The new job may indicate to bulk processing engine 104 to reverse the changes made in the previous job, such that the information associated with the subject domain names reverts back to their original state.

The foregoing description is illustrative, and variations in configuration and implementation may occur to persons skilled in the art. For example, while embodiments have been described in which one bulk processing engine 104 operates to control one registry database 105, in embodiments, one bulk processing engine 104 can control and manage multiple databases for one or more registries. Similarly, while embodiments have been described in which bulk processing engine 104 is configured as a single device or service, in embodiments, the bulk processing engine 104 can be implemented as multiple servers, platforms, applications, and/or services, including applications, data, and/or services hosted in a cloud-based network. Other resources described as singular or integrated can in embodiments be plural or distributed, and resources described as multiple or distributed can in embodiments be combined. The scope of the present teachings is accordingly intended to be limited only by the following claims.

The invention claimed is:

1. A method of managing a domain name system, comprising:
receiving a request for bulk modification of a set of records, wherein the set of records corresponds to registry objects managed by different registrars;
designating a use case for the request for bulk modification, wherein the use case indicates that each modification of a plurality of modifications in the request for bulk modification is associated with a same type of action, and wherein the use case is associated with a set of parameters;
accessing a set of registry policies; and
executing, using a processor, the bulk modification of the set of records by:
performing a first operation of the bulk modification associated with a first record of the set of records that satisfies the set of registry policies and the set of parameters;
denying a performance of a second operation of the bulk modification associated with a second record of the set of records based on identifying that the second operation would result in a violation of a parameter of the set of parameters; and
denying a performance of a third operation of the bulk modification associated with a third record of the set of records based on identifying that the third operation would result in a violation of a registry policy of the set of registry policies.

2. The method of claim 1, wherein the set of records comprises attributes associated with the registry objects.

3. The method of claim 2, wherein the attributes comprise at least one from a group consisting of:
domain name inception data,
domain name expiration data,
domain name ownership data, or
zone data related to a domain name.

4. The method of claim 1, wherein the execution of the bulk modification comprises executing the bulk modification at a time based on a priority level associated with the use case.

5. The method of claim 4, wherein the execution of the bulk modification comprises executing the bulk modification on a batch basis.

6. The method of claim 1, wherein the request for the bulk modification is received at a domain name registry.

7. The method of claim 6, wherein the execution of the bulk modification comprises executing the bulk modification at an off-peak period of the domain name registry.

8. The method of claim 6, wherein the registry objects comprise domain name records.

9. The method of claim 1, wherein the registry objects comprise records comprising administrative and contact data regarding domain name registrants.

10. The method of claim 1, wherein the set of registry policies comprises at least one from a group consisting of:
a set of security policies,
a set of data consistency policies,
a set of privacy policies, or
a set of data dependency policies.

11. The method of claim 1, further comprising generating a report of auditable results of the execution of the bulk modification.

12. The method of claim 1, further comprising performing a rollback operation on the bulk modification based on a validated user request.

13. The method of claim 1, wherein the same type of action associated with the request for the bulk modification comprises at least one from a group consisting of:
   an update action, or
   a transfer action.

14. The method of claim 1, wherein denying the performance of the second operation and the third operation comprises suspending operation of the second operation and the third operation.

15. The method of claim 1, wherein denying the performance of the second operation and the third operation comprises skipping operation of the second operation and the third operation.

16. A system, comprising:
   a memory storing instructions; and
   a processor coupled to the memory, the processor executing the instructions to perform a method comprising:
      receiving a request for bulk modification of a set of records, wherein the set of records corresponds to registry objects managed by different registrars;
      designating a use case for the request for bulk modification, wherein the use case indicates that each modification of a plurality of modifications in the request for bulk modification is associated with a same type of action, and wherein the use case is associated with a set of parameters;
      accessing a set of registry policies; and
      executing the bulk modification of the set of records by:
         performing a first operation of the bulk modification associated with a first record of the set of records that satisfies the set of registry policies and the set of parameters;
         denying a performance of a second operation of the bulk modification associated with a second record of the set of records based on identifying that the second operation would result in a violation of a parameter of the set of parameters; and
         denying a performance of a third operation of the bulk modification associated with a third record of the set of records based on identifying that the third operation would result in a violation of a registry policy of the set of registry policies.

17. The system of claim 16, wherein the request for the bulk modification is received at a domain name registry.

18. The system of claim 17, wherein the registry objects comprise domain name records.

19. The system of claim 16, wherein the registry objects comprise records comprising administrative and contact data regarding domain name registrants.

20. A non-transitory computer readable storage medium comprising instructions for causing a processor to:
   receive a request for bulk modification of a set of records, wherein the set of records corresponds to registry objects managed by different registrars;
   designate a use case for the request for bulk modification, wherein the use case indicates that each modification of a plurality of modifications in the request for bulk modification is associated with a same type of action, and wherein the use case is associated with a set of parameters;
   access a set of registry policies; and
   execute the bulk modification of the set of records by:
      performing a first operation of the bulk modification associated with a first record of the set of records that satisfies the set of registry policies and the set of parameters;
      denying a performance of a second operation of the bulk modification associated with a second record of the set of records based on identifying that the second operation would result in a violation of a parameter of the set of parameters; and
      denying a performance of a third operation of the bulk modification associated with a third record of the set of records based on identifying that the third operation would result in a violation of a registry policy of the set of registry policies.

* * * * *